United States Patent [19]

Calvert et al.

[11] Patent Number: 4,495,166
[45] Date of Patent: Jan. 22, 1985

[54] SYNTHESIS OF ZSM-5 UTILIZING A MIXTURE OF QUATERNARY AMMONIUM IONS AND AMINES

[75] Inventors: Robert B. Calvert, Plainsboro; Louis D. Rollmann, Princeton, both of N.J.

[73] Assignee: Mobil Oil Corporation, New York, N.Y.

[21] Appl. No.: 399,575

[22] Filed: Jul. 19, 1982

[51] Int. Cl.³ ............................................. C01B 33/28
[52] U.S. Cl. ..................................... 423/329; 423/328; 423/330
[58] Field of Search .............................. 423/328, 329; 252/431 N, 455 Z; 264/448 C; 502/77

[56] References Cited

U.S. PATENT DOCUMENTS

| | | | |
|---|---|---|---|
| 3,702,886 | 11/1972 | Argauer et al. | 423/328 |
| 3,709,979 | 1/1973 | Chu | 423/328 |
| 4,108,881 | 8/1978 | Rollmann et al. | 423/329 |
| 4,139,600 | 2/1979 | Rollmann et al. | 423/329 |
| 4,151,189 | 4/1979 | Rubin et al. | 423/329 |
| 4,205,053 | 5/1980 | Rollmann et al. | 423/329 |
| 4,397,827 | 8/1983 | Chu | 423/329 |
| 4,414,189 | 11/1983 | Kokotailo et al. | 423/328 |

FOREIGN PATENT DOCUMENTS

| | | | |
|---|---|---|---|
| 15132 | 3/1980 | European Pat. Off. | 423/328 |
| 11362 | 5/1980 | European Pat. Off. | 423/329 |
| 14059 | 8/1980 | European Pat. Off. | |

Primary Examiner—Edward J. Meros
Assistant Examiner—Jackson Leeds
Attorney, Agent, or Firm—A. J. McKillop; M. G. Gilman; J. F. Powers, Jr.

[57] ABSTRACT

A novel process for the preparation of ZSM-5 and ZSM-11 utilizing a mixture of both quaternary ammonium ions and amines in the forming solution is disclosed in order to enhance the rate of crystallization.

5 Claims, No Drawings

SYNTHESIS OF ZSM-5 UTILIZING A MIXTURE OF QUATERNARY AMMONIUM IONS AND AMINES

BACKGROUND OF THE INVENTION

The present invention relates to a novel process for the preparation of ZSM-5 and ZSM-11 zeolites utilizing in the respective reaction mixtures both quaternary ammonium ions and amines. It has been found quite unexpectedly that a synergism exists as between the quaternary ammonium ions and the amines at certain concentration levels resulting in the production of highly crystalline forms of ZSM-5 and ZSM-11 in much shorter times than has heretofore been possible with either of the two reactants alone. An additional benefit of the novel process of this invention is that it substitutes a relatively inexpensive amine for at least a portion of the quaternary ammonium ion compounds thereby contributing significantly to the overall economics of the process.

SUMMARY OF THE PRIOR ART

Zeolite ZSM-5 is a zeolite which in its conventionally synthesized aluminosilicate form has the following composition expressed in terms of mol ratios of oxides in the anhydrous state $$0.9 \pm 0.2 M_{2/n}O.Al_2O_3.XSiO_2$$

wherein M is selected from the group consisting of mixtures of tetraalkylammonium cations, the alkyl groups of which contain 2–5 carbon atoms and alkali metal cations, especially sodium, and x is at least 5 up to infinity, said cations having the valence n. Additional $M_{2/n}O$ may be present, beyond that required to change balance framework aluminum. ZSM-5 has a distinctive X-ray diffraction pattern which further identifies it from other known zeolites. The original alkali metal cations of ZSM-5 can be exchanged by ion exchange with other ions to form species of the zeolite which have exceptional catalytic properties. ZSM-5 and its conventional preparation are the subject of U.S. Pat. No. 3,702,886, the disclosure of which is incorporated herein by reference.

ZSM-11 is a zeolite which in its conventionally synthesized aluminosilicate form has the following composition expressed in terms of mol ratios of oxides in the anhydrous state $(0.9 \pm 0.3)$ $M_{2/n}O.Al_2O_3.XSiO_2$ wherein M is a mixture of at least one of the quaternary cations of Group VA of the Periodic Table such as tetrabutylammonium with tetrabutylphosphonium and alkali metal cations, especially sodium, n is the valence of M and x can range from 10 to 150 when alumina is deliberately added to the forming solution. If alumina is not deliberately added to the forming solution, x can approach infinity. Again, additional $M_{2/n}O$ may be present. The original alkali metal cations of ZSM-11 can be exchanged by ion exchange with other ions to form species of the zeolites which have catalytic properties. ZSM-11 and its conventional preparation are the subject of U.S. Pat. No. 3,709,979, the disclosure of which is herein incorporated by reference.

As can be seen, the conventional preparation for the synthesis of ZSM-5 and ZSM-11 required quaternary ammonium cations as the sole nitrogen-containing material in the forming solutions.

Recently, there have been improvements in the synthesis of both ZSM-5 and ZSM-11 wherein quaternary ammonium ions were omitted from the forming solution and replaced by amines. Thus, for example, U.S. Pat. No. 4,151,189 is directed towards a novel process for the synthesis of various zeolites, including ZSM-5 wherein the quaternary ammonium ion conventionally used in the synthesis is omitted and replaced by a primary amine, particularly one having from two to nine carbon atoms. In like manner, U.S. Pat. No. 4,139,600 is directed towards a process for the synthesis of ZSM-5 wherein quaternary ammonium ions are omitted and replaced by various diamines, such as pentane diamine, hexane diamine, etc. U.S. Pat. No. 4,108,881 is directed towards a process for the preparation of ZSM-11 wherein the quaternary ammonium ions conventionally present in the forming solution are replaced by one or more alkylene diamines.

SUMMARY OF THE INVENTION

It has now been discovered that significant advantages can be obtained in the synthesis of ZSM-5 and ZSM-11 if a portion of the quaternary ammonium cations conventionally used in their synthesis are replaced with amines and in particular with low molecular weight amines. For reasons which are not at all understood, it has been found that there is a synergism which exists in the use of both quaternary ammonium compounds and amines in the synthesis of ZSM-5 and ZSM-11 in that enhanced conversion rates are obtained leading to products having excellent crystallinity in a comparatively short period of time.

It is to be immediately understood that the concept of synthesizing zeolitic materials from a reaction medium containing both quaternary ammonium ions and amines is not new and is, in fact, disclosed and claimed in U.S. Pat. No. 4,205,053. As is disclosed on columns 8 of said patent, an amine is added to a forming solution containing a quaternary ammonium compound in an amount effective to alter the microscopic texture of the resulting crystals. In the examples in said patent, particularly Examples 6–11 which are specifically directed towards ZSM-5 type zeolites, an amine was added to a forming solution which already contained a quaternary ammonium compound and a crystal structure was obtained having a different microscopic texture than would have been obtained from preparing the same zeolite without the added amine.

It is to be immediately understood that the instant inventive concept is in no way concerned with altering the microscopic texture of a crystalline structure nor is it concerned with operating at the high levels of quaternary ammonium compound used in the process of U.S. Pat. No. 4,205,053.

It has been found that the synergism which exists between an amine and a quaternary ammonium compound with regard to enhancing the crystallization rate does not exist over all ranges of concentration of amine and quaternary to silica, but only exists over a very narrow and critical range. It should be immediately apparent that a quaternary ammonium cation has the ability to cause the crystallization of ZSM-5 and ZSM-11 type zeolites by itself, if used in a sufficient amount, such that the addition of an amine can in no way effect the rate of crystallization if sufficient quaternary ammonium compound is already present. The same is true with regard to amines. It is known in the art that amines, if used in sufficient quantity, also provide acceptable rates of crystallization by themselves and if they are used in said sufficient quantities, the addition of a quaternary ammonium cation will not result in any synergism.

Thus, quite simply put, the novel process of this invention resides in using both a quaternary ammonium compound and an amine in a forming solution wherein the amount of quaternary ammonium compound in and of itself would be at such a low level that it would not result in acceptable crystallization rates and the amine, if used alone, would suffer from the same deficiency. However, when they are used together, the crystallization rate is enhanced in an amount above and beyond that expected from each individual component alone so that a definite synergism occurs.

DESCRIPTION OF THE PREFERRED EMBODIMENTS

As has previously been pointed out, the novel process of this invention involves the preparation of ZSM-5 and ZSM-11 type zeolites from reaction mixtures containing both quaternary ammonium ions and amines together with the usual constituents present in the synthesis of zeolitic materials, i.e. silica, water, alkali metal cations and optionally alumina.

The novel process of this invention is operable over a range of molar ratio of quaternary ammonium compound to silica of from 0.001 to 0.04. Above this range, the quaternary ammonium compound alone is effective to give rapid rates of crystallization while below this range the quaternary ammonium content appears to become rate limiting. The amount of tetraalkylammonium ion plus amine (hereinafter referred to as total organic) which is utilized in the novel process of this invention is that amount which will provide a total organic to silica molar ratio of from about 0.02 to 0.22. Obviously the difference between the total organic to silica ratio and the quaternary ammonium to silica ratio is the amount of amine utilized and it ranges from 0.02 to 0.18 moles amine per mole of silica.

The quaternary ammonium ion compounds useful in the novel process of this invention are those customarily used in the synthesis of ZSM-5 or ZSM-11 and include tetraalkylammonium compounds, the alkyl group of which contains 2–5 carbon atoms such as for example tetrapropylammonium, tetraethylammonium, tetrabutylammonium and tetrabutylphosphonium compounds. Amines which are operable in the novel process of this invention include both primary, secondary, tertiary, and cyclic amines.

The preferred amines represented by the formula $R_1R_2R_3N$ wherein $R_1$ and $R_2$ represent hydrogen and lower alkyl groups of from 2–8 carbon atoms and $R_3$ represents alkyl groups of from 2–8 carbon atoms. It is to be understood that alkylene diamines are also operable in the novel process of this invention especially a polymethylene diamine having from 7–12 carbon atoms.

As has heretofore been pointed out, the forming solution can also contain a source of deliberately added alumina which can be conveniently supplied as sodium aluminate or aluminum sulfate. It is to be understood, however, that no deliberately added alumina need be added to the forming solution such that the silica-to-alumina ratio of the various zeolites which are synthesized range from 10 up to as close to infinity as is reasonably practical. Preferred silica-to-alumina ratios are from 20 to 2000.

The following examples will now illustrate the novel process of carrying out this invention.

EXAMPLE 1

This example demonstrates that the use of tetrapropylammonium ion at low levels affects the rate of crystallization.

Into a stirred autoclave was added Q-brand sodium silicate (28.9 wt. % $SiO_2$, 8.9 wt. % $Na_2O$, 62.2 wt. % $H_2O$), hydrated aluminum sulfate, water, and tetrapropylammonium bromide (TPABr). The reaction mixture had the following composition, expressed as mol ratios.

| | |
|---|---|
| $SiO_2/Al_2O_3$ | 90 |
| $H_2O/SiO_2$ | 20 |
| $OH^-/SiO_2$ | 0.1 |
| $Na^+/SiO_2$ | 0.6 |
| $TPA/SiO_2$ | 0.005 |

Crystallization was carried out at 160° C. in a helium atmosphere (300 psi) for six hours. The product obtained was ZSM-5 having an X-ray crystallinity of only 40% when compared with a known standard.

As is demonstrated from the above, a $TPA/SiO_2$ molar ratio of 0.005 is too low to obtain a good rate of crystallization.

EXAMPLE 2

The procedure of Example 1 was repeated with the sole exception that the tetrapropylammonium bromide was omitted and replaced with i-propylamine.

The reaction mixture had the following composition expressed as mol ratios:

| | |
|---|---|
| $SiO_2/Al_2O_3$ | 90 |
| $H_2O/SiO_2$ | 20 |
| $OH^-/SiO_2$ | 0.1 |
| $Na^+/SiO_2$ | 0.6 |
| $Amines/SiO_2$ | 0.045 |

Crystallization was carried out in the identical manner as Example 1 and after six hours a product was obtained which had 0% crystallinity.

Thus, as is obvious from the above example, the use of 0.045 mols of amine per mol of silica simply did not affect the crystallization to ZSM-5 within the time period stated.

EXAMPLE 3

The procedure of Example 2 is repeated with the exception that both tetrapropylammonium bromide and isopropylamine were employed. The reaction composition was identical to that set forth in Example 1 with the exception that the molar ratio of TPA to $SiO_2$ was 0.0075 and the molar ratio of amine to $SiO_2$ was 0.042 giving a total organics to $SiO_2$ molar ratio of 0.05.

Crystallization was carried out as previously described and after six hours a ZSM-5 was obtained having a crystallinity of 80%.

Quite obviously, the procedure of this example clearly demonstrates the increased rate of crystallization.

EXAMPLES 4–14

The procedure of Example 1 was carried out with the exception that n-butylamine was utilized in place of the isopropylamine. The following table lists the results obtained in carrying out crystallization at 160° for six hours as well as the molar ratio of the various reactants employed.

TABLE 1

| Example | $SiO_2/Al_2O_3$ | $H_2O/SiO_2$ | $OH^-/SiO_2$ | $Na^+/SiO_2$ | $TPA/SiO_2$ | $Amine/SiO_2$ | Product ZSM-5 Crystallinity |
|---|---|---|---|---|---|---|---|
| 4  | 90 | 20 | .1 | .6 | .005  | 0     | 40% |
| 5  | 90 | 20 | .1 | .6 | .1    | 0     | 90% |
| 6  | 90 | 20 | .1 | .6 | .008  | .045  | 95% |
| 7  | 90 | 20 | .1 | .6 | .005  | .045  | 85% |
| 8  | 90 | 20 | .1 | .6 | .003  | .045  | 80% |
| 9  | 90 | 20 | .1 | .6 | .0024 | .045  | 95% |
| 10 | 90 | 20 | .1 | .6 | .001  | .045  | 55% |
| 11 | 90 | 20 | .1 | .6 | .0092 | .0191 | 95% |
| 12 | 90 | 20 | .1 | .6 | .0046 | .095  | 95% |
| 13 | 90 | 20 | .1 | .6 | .0024 | .045  | 95% |
| 14 | 90 | 20 | .1 | .6 | .0012 | .024  | 50% |

As is obvious from the above Table, Example 4 is the same as Example 1 and is included in tabular form so that the data will be even more meaningful. Example 5 increased the TPA to $SiO_2$ ratio to 0.1 and as can be seen at this high level, the TPA alone was sufficient to give very acceptable rates of crystallization. Also note that Example 10 which had a $TPA/SiO_2$ of 0.001, i.e. the lower limit of this invention, resulted in a marginal crystallization rate. The same comment is equally applicable to Example 14.

EXAMPLES 15-28

The procedure of Examples 4-14 was repeated with the exception that the amine employed was tripropylamine, as opposed to n-butylamine. All experiments were carried out in the manner previously set forth and the various mol ratios of reactants, as well as the results obtained are shown in the following table.

TABLE 2

Tripropylamine/TPA Runs

| Example | $TPA/SiO_2$ | $Pr_3N/SiO_2$ | Time (hrs.) | ZSM-5 Crystallinity (%) |
|---|---|---|---|---|
| 15 | 0.1  | —    | 20 | 92  |
| 16 | 0.1  | —    | 20 | 94  |
| 17 | 0.09 | 0.02 | 20 | 100 |
| 18 | 0.09 | 0.02 | 20 | 100 |
| 19 | 0.05 | 0.1  | 20 | 99  |
| 20 | 0.05 | 0.1  | 20 | 100 |
| 21 | 0.01 | 0.17 | 20 | 100 |
| 22 | 0.01 | 0.17 | 20 | 98  |
| 23 | —    | 0.2  | 20 | 100 |
| 24 | —    | 0.2  | 20 | 100 |
| 25 | 0.1  | —    | 8  | 90  |
| 26 | 0.1  | —    | 6  | 87  |
| 27 | —    | 0.2  | 7  | 100 |
| 28 | 0.09 | 0.02 | 7  | 99  |

In each of these experiments the silica-to-alumina molar ratio was 90 and the $H_2O/SiO_2$ ratio was 20 and the $OH^-/SiO_2$ ratio was 0.1 and the $Na^+/SiO_2$ ratio was 0.6.

As can be seen from the above table, Examples 15 and 16 are, in essence, very similar to Examples 4 and 5 with the exception that the crystallization time was 20 hours as opposed to six hours. As is obvious, these high ratios of $TPA/SiO_2$ resulted in very acceptable crystallinity. Examples 17, 18, 19, 20, 25, 26 and 28 also have $TPA/SiO_2$ ratios sufficient in and of themselves to give rapid rates of crystallization. Examples 23, 24 and 27 are amine alone experiments and, as can be seen, this amount of amine was sufficient to give acceptable crystallinity rates. Examples 21 and 22 exhibit synergism.

EXAMPLE 29

The following examples will further demonstrate the synergism between amine and quaternary ammonium compound when operating at the concentration ranges of this invention. The procedure of Example 4 was repeated with the exception that no tetrapropylammonium ion was employed and the sole organic was n-butylamine used in an amount of an amine to silica ratio of 0.1. The result obtained after six hours of crystallization as well as a comparison with Examples 4 and 9 is set forth in the following table.

TABLE 3

| Example | 29 | 4 | 9 |
|---|---|---|---|
| $SiO_2/Al_2O_3$ | 90 | 90 | 90 |
| $H_2O/SiO_2$ | 20 | 20 | 20 |
| $OH^-/SiO_2$ | .1 | .1 | .1 |
| $Na^+/SiO_2$ | .6 | .6 | .6 |
| $TPA/SiO_2$ | 0 | .005 | .0024 |
| $Amine/SiO_2$ | .1 | 0 | .045 |
| Product ZSM-5 Crystallinity | 25% | 40% | 95% |

Thus, Example 29 demonstrates that at an amine only level of 0.1 mol per mol of silica, a product was obtained in six hours that had only a 25% crystallinity. Example 4 shows that the use of TPA-silica ratio of 0.005 resulted in a product which had a crystallinity of only 40% after six hours. However, Example 9 which used both a mixture of tetrapropylammonium and amine had a 95% crystallinity at the end of six hours, thereby conclusively demonstrating an enhanced reaction rate. It is interesting that the total organics in Example 29 was 0.1, whereas the total organic in Example 9 was 0.0474. Also note that roughly half the tetrapropylammonium was used in Example 9 as was used in Example 4 and less than half the amount of amine was used in Example 9 as used in Example 29 and yet the rate of crystallization was dramatically enhanced.

EXAMPLES 30-39

The utility of other amines in combination was trace amounts of TPA ion has been investigated and the results are shown in the table below. With only minor exception, those amines which were particularly effective in the absence of TPA ($nPr_2NH$, $nPr_3N$, $nBuNH_2$, $nBu_2NH$, $nBu_3N$) were also most effective in conjunction with small quantities of TPA ion. In addition, i-$Pr_2NH$, a marginal performer alone, joins the list in the presence of TPA.

These experiments were conducted in the identical manner as previously described in connection with Examples 4–14, i.e. 160° C., stirred for six hours, silica-to-alumina ratio of 90 and $H_2O/SiO_2$ ratio of 20, an $OH^-/SiO_2$ ratio of 0.1, a $Na^+/SiO_2$ ratio of 0.6.

The various amines used as well as the $TPA/SiO_2$ and Amine/$SiO_2$ ratios and the results obtained are shown in the following table together with a comparison with previously presented Examples 26, 4 and 6.

TABLE 4

Amine + TPA Experiments
(160° C., stirred, 6 hours, 90/20/0.1/0.6/varied)

| Example | Amine | TPA $SiO_2$ | Amine $SiO_2$ | ZSM-5 Crystallinity (%) |
|---|---|---|---|---|
| 26 | — | 0.1 | — | 87 |
| 4 | — | 0.005 | — | 40 |
| 30 | Ethylamine | 0.01 | 0.045 | 76 |
| 31 | n-propylamine | 0.01 | 0.045 | 77 |
| 32 | i-propylamine | 0.01 | 0.045 | 79 |
| 6 | n-butylamine | 0.01 | 0.045 | 95 |
| 33 | Diethylamine | 0.01 | 0.045 | 78 |
| 34 | di-n-propylamine | 0.01 | 0.045 | 90 |
| 35 | di-i-propylamine | 0.01 | 0.045 | 91 |
| 36 | di-n-butylamine | 0.01 | 0.045 | 93 |
| 37 | Triethylamine | 0.01 | 0.045 | 83 |
| 38 | Tripropylamine | 0.01 | 0.045 | 97 |
| 39 | Tributylamine | 0.01 | 0.045 | 81 |

As can be seen from the above table, a wide variety of amines are applicable in the novel process of this invention and excellent crystallinity was obtained.

What is claimed is:

1. In a process of manufacturing zeolite ZSM-5 which process comprises crystallizing an aqueous forming solution comprising a source of silica and a nitrogenous template and recovering said zeolite ZSM-5, the improvement which comprises utilizing as said nitrogenous template both a tetrapropyl-ammonium salt and an amine having the formula $R_1R_2R_3N$ wherein $R_1$ and $R_2$ are selected from the group consisting of hydrogen and lower alkyl of from 2–8 carbon atoms and $R_3$ is a lower alkyl of from 2–8 carbon atoms wherein the molar ratio of tetrapropylammonium salt to silica ranges from about 0.001 to 0.04, wherein the molar ratio of said amine to silica ranges from about 0.02 to about 0.18 and wherein the molar ratio of both the tetrapropylammonium salt and the amine to silica ranges from about 0.02 to about 0.22.

2. The process of claim 1 wherein the forming solution also contains a source of alumina.

3. The process of claim 1 where the amine is selected from the group consisting of n-butylamine, ethylamine, n-propylamine, i-propylamine, diethylamine, di-n-propylamine, di-i-propylamine, di-n-butylamine, , triethylamine, tripropylamine, and tributylamine.

4. The process of claim 3 where the amine is n-butylamine.

5. The process of claim 3 where the amine is i-propylamine.

* * * * *